(12) United States Patent
Yun (10) Patent No.: US 10,537,992 B2
(45) Date of Patent: Jan. 21, 2020

(54) SPEED REDUCER

(71) Applicant: Eun Seok Yun, Seoul (KR)

(72) Inventor: Eun Seok Yun, Seoul (KR)

(73) Assignee: P&I COMPANY, Jeju-si, Jeju-Do (KR)

(*) Notice: Subject to any disclaimer, the term of this patent is extended or adjusted under 35 U.S.C. 154(b) by 81 days.

(21) Appl. No.: 15/777,830

(22) PCT Filed: Sep. 30, 2016

(86) PCT No.: PCT/KR2016/010971
§ 371 (c)(1),
(2) Date: May 21, 2018

(87) PCT Pub. No.: WO2017/057946
PCT Pub. Date: Apr. 6, 2017

(65) Prior Publication Data
US 2018/0345488 A1 Dec. 6, 2018

(51) Int. Cl.
| | | |
|---|---|---|
| *B25J 17/00* | (2006.01) | |
| *B25J 17/02* | (2006.01) | |
| *B25J 18/00* | (2006.01) | |
| *B25J 9/10* | (2006.01) | |
| *F16H 37/04* | (2006.01) | |
| *F16H 1/30* | (2006.01) | |
| *F16H 1/16* | (2006.01) | |

(Continued)

(52) U.S. Cl.
CPC ............. *B25J 9/1025* (2013.01); *B25J 9/102* (2013.01); *F16H 1/16* (2013.01); *F16H 1/30* (2013.01); *F16H 37/041* (2013.01); *F16H 1/14* (2013.01); *F16H 1/203* (2013.01); *F16H 1/225* (2013.01); *F16H 1/28* (2013.01); *F16H 49/001* (2013.01)

(58) Field of Classification Search
CPC .... F16H 1/225; F16H 2057/121; F16H 57/12; B25J 9/1025; B25J 9/102
See application file for complete search history.

(56) References Cited

U.S. PATENT DOCUMENTS

| | | | | |
|---|---|---|---|---|
| 3,152,488 A | * | 10/1964 | Sergan | ............. F16H 1/225 74/427 |
| 3,369,420 A | * | 2/1968 | Spyra | ............. F16H 1/225 74/411 |
| 5,598,749 A | * | 2/1997 | Goto | ............. B23Q 5/38 403/277 |

FOREIGN PATENT DOCUMENTS

| | | |
|---|---|---|
| JP | 07-023841 U | 5/1995 |
| JP | 07-148632 A | 6/1995 |

(Continued)

*Primary Examiner* — Jake Cook
(74) *Attorney, Agent, or Firm* — Novick, Kim & Lee, PLLC; Jae Youn Kim (57) ABSTRACT

The present invention is characterized by comprising: a pair of worm shafts, which are arranged in parallel with each other so as to have gear directions that are opposite to each other, and which are configured to be rotated in the same direction by a driving means; a following shaft that crosses the middle of the pair of worm shafts in the perpendicular direction; a pair of ring gears fixedly installed on the following shaft so as to face each other from both sides of the worm shafts; a worm wheel, which engages with the outer side of each worm shaft, and which has shaft gears formed on both sides thereof, respectively, such that the shaft gears engage with the ring gears; and a rotating member connected to the following shaft such that a rotating force, which is in a speed-reduced sate, is output.

8 Claims, 11 Drawing Sheets

(51) Int. Cl.
    *F16H 1/22*     (2006.01)
    *F16H 1/14*     (2006.01)
    *F16H 1/20*     (2006.01)
    *F16H 1/28*     (2006.01)
    *F16H 49/00*     (2006.01)

(56) References Cited

FOREIGN PATENT DOCUMENTS

| | | |
|---|---|---|
| JP | 2001-327121 A | 11/2001 |
| JP | 2007-085416 A | 4/2007 |
| KR | 10-2014-0096683 A | 8/2014 |

\* cited by examiner

SPEED REDUCER

TECHNICAL FIELD

The present invention relates to a speed reducer, and more particularly to a speed reducer that has a simple structure and is capable of realizing accurate and stable power transmission while reducing a speed.

BACKGROUND ART

In general, a conventional speed reducer is driven through a construction that includes a pinion shaft configured to receive power of a motor, a speed reduction gear disposed at one end of the pinon shaft and formed integrally therewith, a ring gear configured to mesh with the speed reduction gear so as to be rotated therewith, and a ring gear shaft fixed to the inner surface of the ring gear in a pin-coupling manner and having therein a pin hole for transmitting the received power to a driving shaft.

In this conventional speed reducer, because an output shaft is coupled to the ring gear shaft by means of a pin, the link therebetween is not firm, and thus power transmission is not smoothly realized. Further, the pin, the ring gear shaft and the output shaft do not withstand rotational force well and are frequently damaged upon long-term operation, leading to failure of the speed reducer.

Further, the ring gear shaft and the ring gear, which are typically fixed to each other using a key, do not withstand rotational force well, and are frequently damaged upon long-term operation of the speed reducer, leading to an increase in the cost of maintaining the speed reducer.

Furthermore, because the output shaft is not securely fixed, the related art has a limitation in transferring minute rotational force due to undesirable movement and uneven wear of the output shaft and has a very complicated structure and a large overall volume, whereby it is a hard task to apply the related art to devices that need to be precisely controlled in industrial machines, e.g. joints of robots, and manufacturing costs thereof are high.

A speed reducer disclosed in Korean no. Laid-open Publication No. 2014-0096683 has been developed in view of the above problems, and this speed reducer includes a driving shaft configured to be rotated by a driving unit, a pair of driving gears including a first driving gear and a second driving gear, which are bevel gears mounted on the end of the driving shaft so as to face each other and having different sizes from each other and the same gear ratio, a pair of driven gears including a first driven gear and a second driven gear, which are bevel gears mounted so as to face each other and respectively mesh with the first driving gear and the second driving gear, a driven shaft configured to support the first driven gear and the second driven gear and to allow the driving shaft to penetrate the middle portion thereof, and a rotary member connected to the driven gears and configured to output rotational force with a speed reduced, whereby the speed reducer is reduced in volume and is precisely operated.

However, the aforementioned related art for speed reduction is configured such that the driving gears, which have the same gear ratio and different sizes from each other, are mounted on the driving shaft so as to face each other and such that the driven gears, which have the same gear ratio and different sizes from each other, are mounted on the driven shaft so as to face each other. Further, because the reduction gear ratio is determined depending on the sizes of the driven gears, the volume of the device increases in order to realize a desired speed reduction, and from a structural aspect it is difficult to apply the related art to a rotary member having a large weight.

DISCLOSURE

Technical Problem

Therefore, the present invention has been made in view of the above problems, and it is an object of the present invention to provide a speed reducer that is capable of transmitting the power of a driving shaft while reducing a speed using a very simple configuration, whereby it can be precisely controlled and reduced in size and can realize stable power transmission without undesirable movement.

It is another object of the present invention to provide a speed reducer in which any of various kinds of gears, e.g. a planetary gear, a spur gear or a harmonic gear, can be used as a speed reduction gear for transmitting rotational force while reducing a speed, whereby it can be widely applied in various fields.

Technical Solution

A speed reducer according to the present invention includes a pair of worm shafts having teeth angled in opposite directions to each other, the worm shafts being arranged parallel to each other and being configured to be rotated in the same direction as each other by a driving unit, a driven shaft mounted between the worm shafts so as to extend in a direction perpendicular to the worm shafts, a pair of ring gears mounted so as to face each other, with the worm shafts interposed therebetween, and fixed to the driven shaft, a worm wheel configured to mesh with the outer side of each of the worm shafts, the worm wheel having shaft gears formed at both sides thereof so as to mesh with the ring gears, and a rotary member connected to the driven shaft to output rotational force with a speed reduced.

A driving gear may be mounted to a driving shaft connected to the driving unit, and both of the worm shafts may mesh with and may be driven by the driving gear.

An auxiliary speed reduction unit may be additionally provided at the driven shaft, and large rotational force may be transmitted to the rotary member, with a speed reduced, by the auxiliary speed reduction unit.

Any of various kinds of devices, e.g. a planetary gear, a spur gear or a harmonic gear, may be selectively used as the auxiliary speed reduction unit, and the rotational force transmitted from the driving shaft may be output as large rotational force, with a speed reduced still further, by the auxiliary speed reduction unit.

The rotary member, which outputs the final driving force with a speed reduced, may be configured as various types depending on an object to which the present invention is applied. The rotary member may be installed so as to be rotatable throughout 360 degrees or may be installed eccentrically on the driven shaft so as to be rotated eccentrically.

Advantageous Effects

As described above, according to the present invention, the rotational force output from a driving unit is transmitted to a pair of worm shafts, and the rotational-axis direction of the driving unit is changed to a direction perpendicular thereto as the rotational force is transmitted to worm wheels, ring gears and a driven shaft. Through this process, the output driving force can be stably transmitted, with a speed reduced, and can be precisely controlled, and both ends of the driven shaft can output the driving force at the same time, thereby preventing undesirable movement of the driven shaft and consequently realizing stable power transmission.

Since any of various kinds of gears, e.g. a planetary gear, a spur gear or a harmonic gear, can be selectively used as a speed reduction gear for transmitting rotational force while reducing a speed, the present invention can be widely applied in various fields.

In addition, the power transmission mechanism of the speed reducer is further simplified, the volume thereof is minimized, the operation thereof can be controlled more precisely and stably, manufacturing costs thereof are reduced, and the speed reducer can be applied to various fields that need a compact size and accuracy.

BEST MODE

Hereinafter, exemplary embodiments of the present invention will be described in detail with reference to the accompanying drawings. It should be noted that the drawings may be exaggerated in thickness of lines or size of components for descriptive convenience and clarity.

Furthermore, the terms used herein are defined by taking functions of the present invention into account and can be changed according to the custom or intention of users or operators. Therefore, definition of the terms should be made according to the overall disclosures set forth herein.

It is noted that the same elements in the accompanying drawings are denoted with the same reference numerals.

Figure 1:
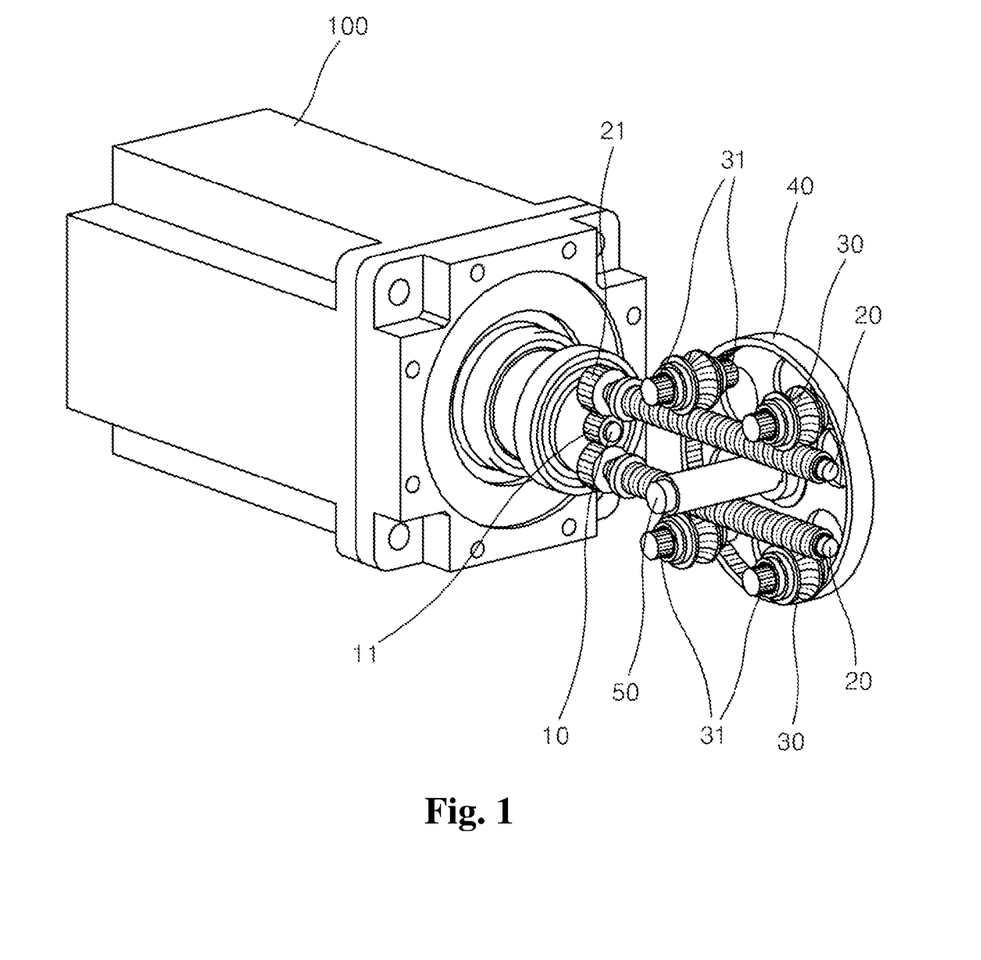
FIG. 1 is a perspective view illustrating essential parts of one embodiment of a speed reducer according to the present invention.
Figure 2:
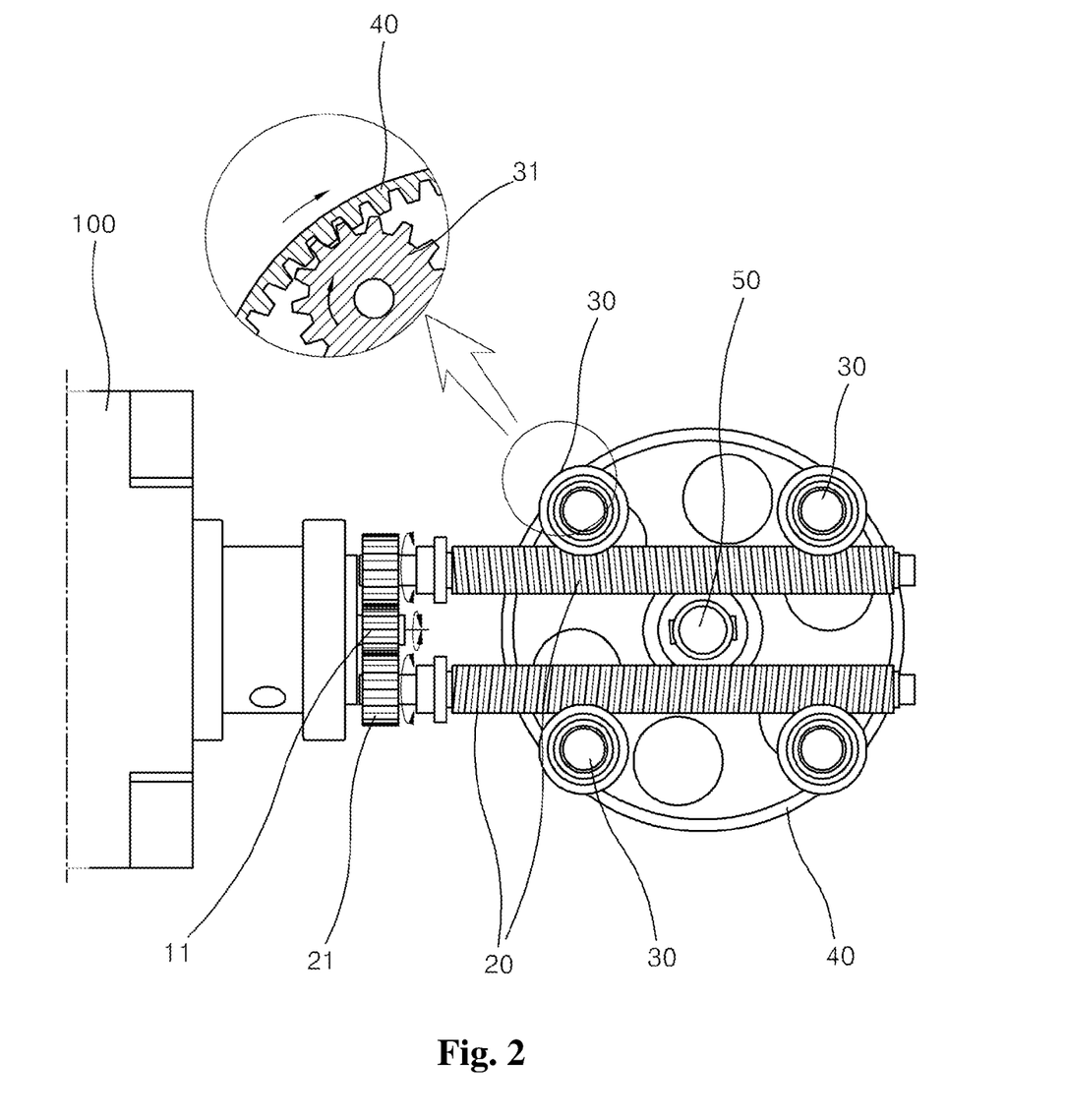
FIG. 2 is a side view illustrating the essential parts depicted in FIG. 1.
Figure 3:
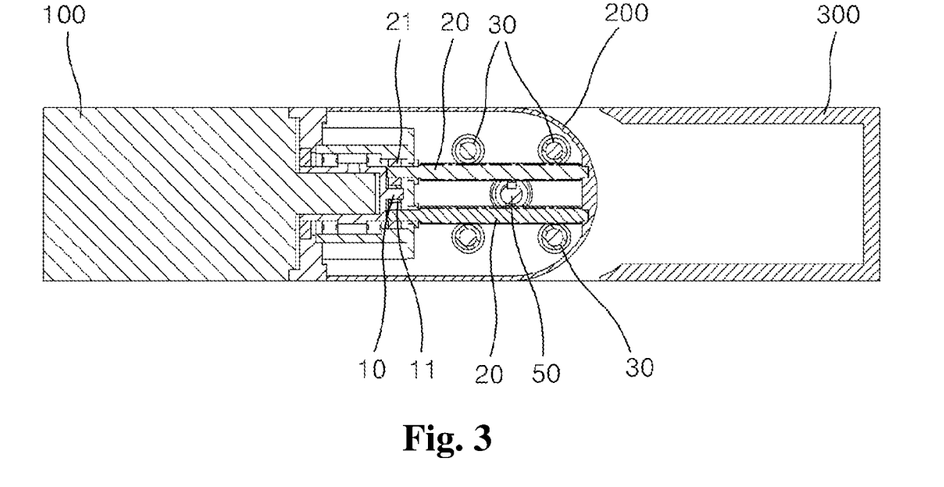
FIG. 3 is a side cross-sectional view schematically illustrating the state in which a joint of a robot is installed to the speed reducer depicted in FIG. 1.
Figure 4:
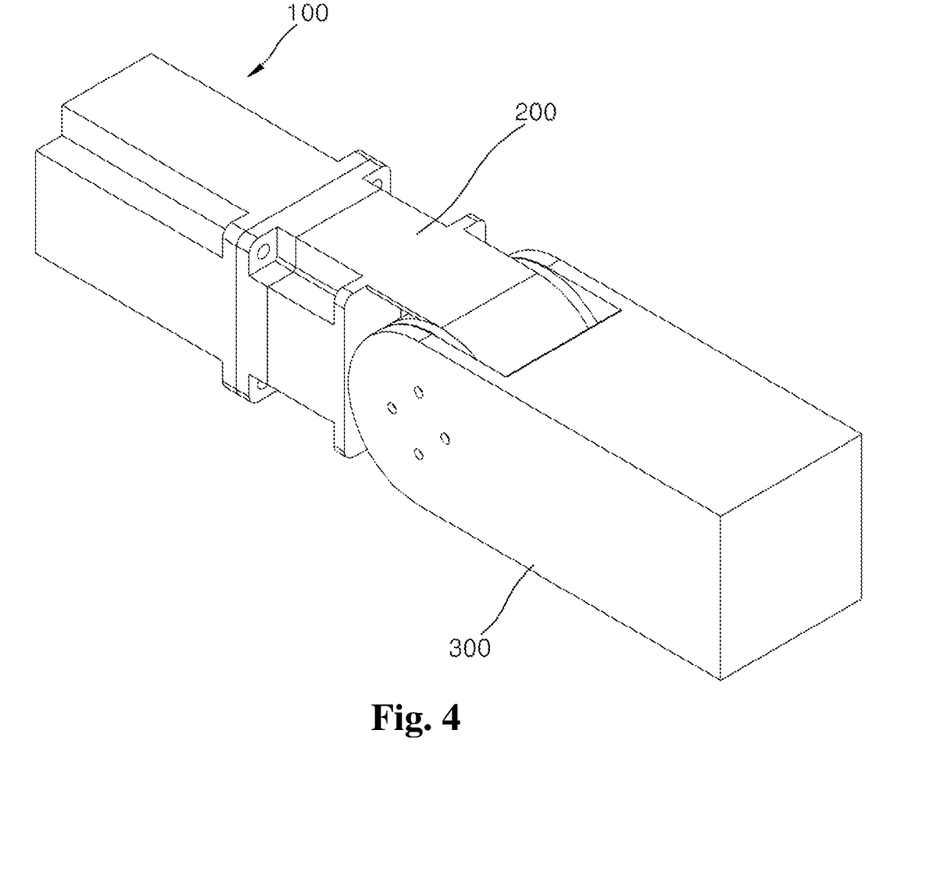
FIG. 4 is a perspective view illustrating one example of the joint of the robot to which the present invention is applied.

FIG. 1 is a perspective view illustrating essential parts of one embodiment of a speed reducer according to the present invention, FIG. 2 is a side view of FIG. 1, FIG. 3 is a side cross-sectional view schematically illustrating the state in which a joint of a robot is installed to the speed reducer depicted in FIG. 1, and FIG. 4 is a perspective view illustrating one example of the joint of the robot to which the present invention is applied. Referring to these drawings, the present invention is configured such that a driving gear 11 is mounted on the end of a driving shaft 10, which is configured to be rotated by a driving unit 100 (a motor, an engine, etc.) for generating rotational force, and such that a pair of worm shafts 20 is arranged in the vertical direction and connected to the driving gear 11.

The worm shafts 20 extend in the horizontal direction while being parallel to each other, and driving transmission gears 21, which mesh with the driving gear 11, are respectively provided at the rear ends of the worm shafts 20.

Therefore, the driving force of the driving unit rotates the worm shafts 20 via the driving gear 11 and the driving transmission gears 21. At this time, the worm shafts 20 rotate in the same direction as each other.

The driving unit may be configured as two driving units, which are separately provided and each of which independently transmits power to a respective one of the worm shafts.

A driven shaft 50 is mounted between the worm shafts 20 and extends in a direction perpendicular to the worm shafts 20, and a pair of ring gears 40 is mounted such that the ring gears 40 face each other, with the worm shafts 20 interposed therebetween, and are fixed to the driven shaft 50.

Each of the ring gears 40 is formed to have an open inner side, and is configured as an internal gear having teeth formed in the inner circumferential surface thereof so as to be rotated together with the driven shaft 50.

Alternatively, each of the ring gears 40 may be configured as an external gear, rather than an internal gear.

A plurality of worm wheels 30 is mounted so as to mesh with the outer sides of the respective worm shafts 20. A pair of worm wheels 30 may be mounted on the outer side of a respective one of the worm shafts 20.

Each of the worm wheels 30 may be configured as a typical spur-gear-type worm wheel. However, as shown in the drawings, each of the worm wheels 30 may be configured as a helical gear or the like as needed, which meshes with the curved surface of the corresponding worm shaft 20, thereby enabling transmission of larger driving force.

Shaft gears 31 protrude from both sides of each of the worm wheels 30, and each of the shaft gears 31 meshes with the internal teeth of a respective one of the ring gears 40. Accordingly, the driving force output from the driving unit is transmitted to the driven shaft 50 via the driving gear 11, the driving transmission gears 21, the worm shafts 20, the worm wheels 30, the shaft gears 31 and the ring gears 40, with a speed reduced.

As shown in FIGS. 3 and 4, a series of gear sets from the driving gear 11 to the driven shaft 50 is enveloped by a housing 200. The end portions of the worm shafts 20 or the middle portions of the worm wheels 30 are supported by the housing 200, and a rotary member 300, which is an object to be rotated by the speed reducer, e.g. a joint of a robot, is connected to the outer side of the housing 200.

Therefore, the driven shaft 50 protrudes further outwards than the ring gears 40, and the rotary member 300 is connected to the protruding portions of the driven shaft 50 so as to be rotated along with the rotation of the driven shaft 50.

Describing the operation of the speed reducer according to the present invention, when the driving shaft 10 and the driving gear 11 are rotated by the driving unit, that is, by the motor 100, both of the driving transmission gears 21, which mesh with the driving gear 11, are rotated, and the worm shafts 20 are rotated in the same direction as each other.

Subsequently, all of the worm wheels 30, which mesh with the worm shafts 20, are rotated in the same direction. To this end, the worm shafts 20 are formed such that the teeth thereof are angled in opposite directions to each other.

The rotation of the worm wheels 30 is transmitted to the ring gears 40 via the shaft gears 31, which are rotated together with the worm wheels 30, and the driven shaft 50 is rotated by the ring gears 40, with a speed reduced.

Figure 5:
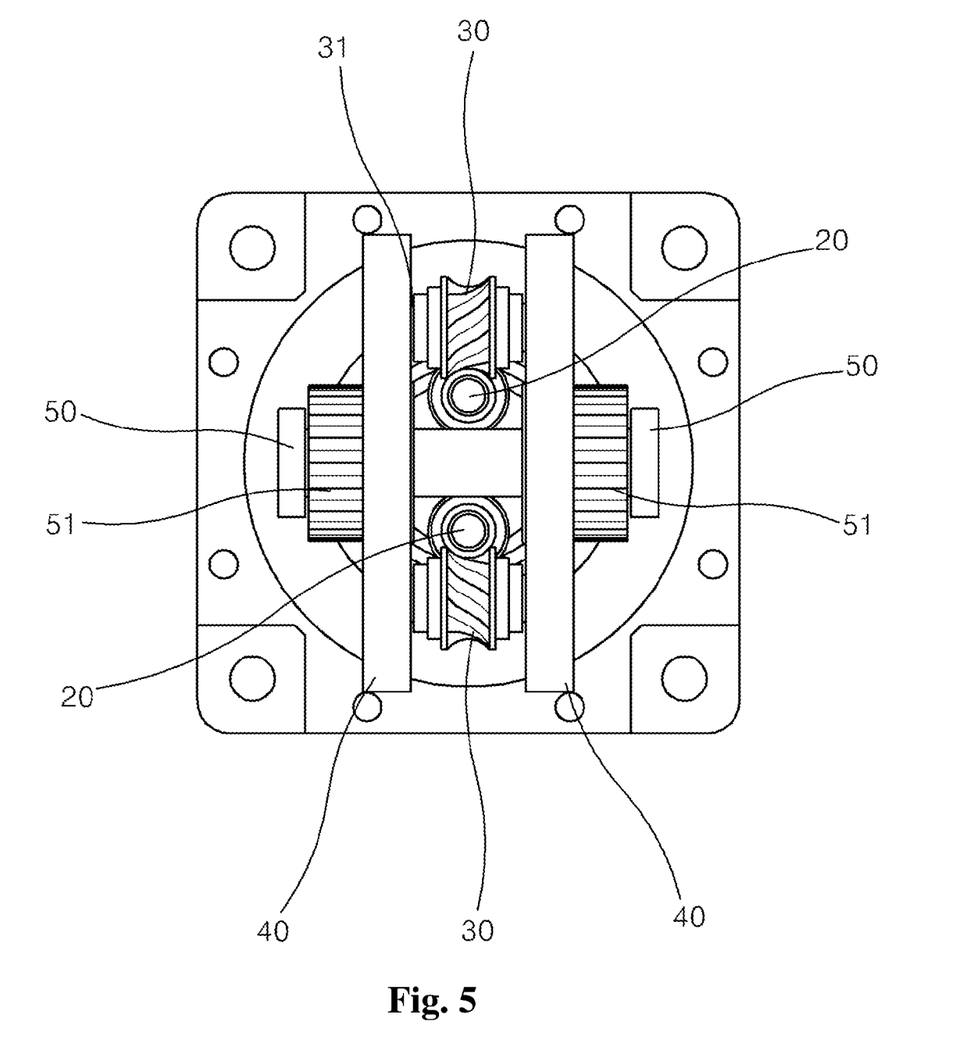
FIG. 5 is a front view illustrating the state in which a driven gear is mounted to a driven shaft of the speed reducer according to the present invention.

In order to reduce the speed further, auxiliary speed reduction units may be further connected to both ends of the driven shaft 50. To this end, as shown in FIG. 5, a driven gear 51 may be further mounted on each of both ends of the driven shaft 50, and a spur gear, a planetary gear, a harmonic gear or the like may be applied or connected to the driven gear 51.

FIGS. 6 to 11 illustrate an embodiment in which each of the auxiliary speed reduction units includes planetary gears. Specifically, each of the auxiliary speed reduction units is configured as a planetary gear device, in which the driven gear 51 mounted on each of both ends of the driven shaft 50 functions as a sun gear and a plurality of planetary gears 60 meshes with the driven gear 51, and the rotary member 300 is connected to the planetary gears 60 so that rotational force is transmitted to the rotary member, with a speed reduced.

Here, the planetary gear device may further include an outer ring gear, which meshes with the planetary gears 60 as needed.

Figure 6:
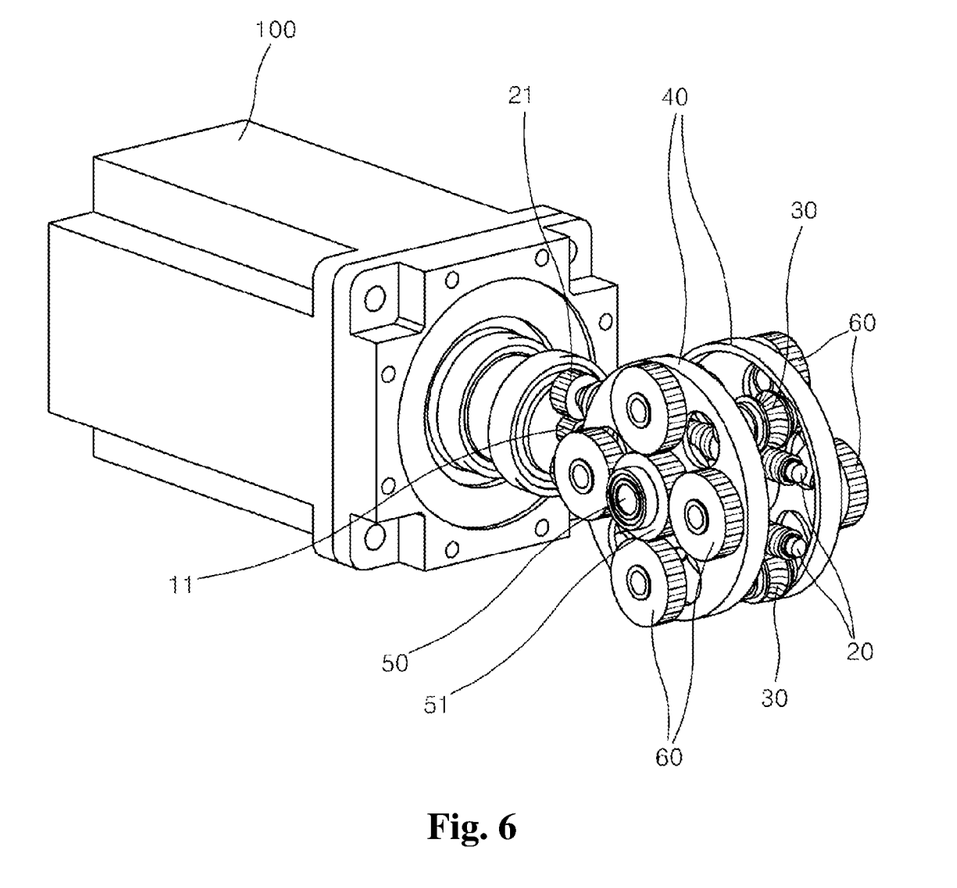
FIG. 6 is a perspective view illustrating the state in which a planetary gear is mounted to the driven shaft of the speed reducer according to the present invention.
Figure 7:
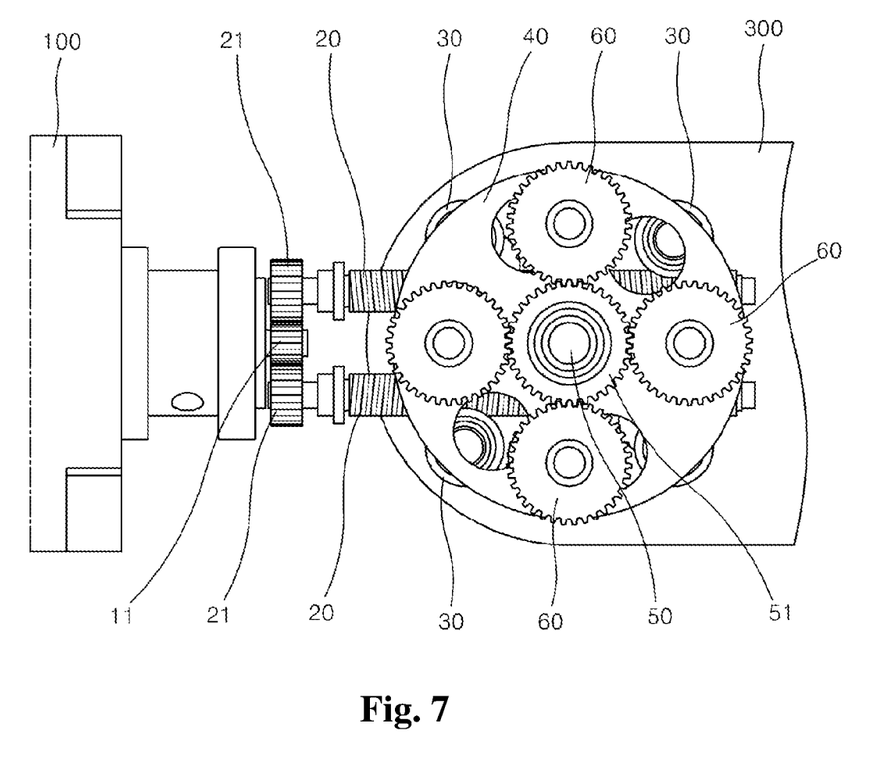
FIG. 7 is a side view illustrating essential parts in the state in which the planetary gear is mounted to the driven shaft of the speed reducer according to the present invention.
Figure 8:
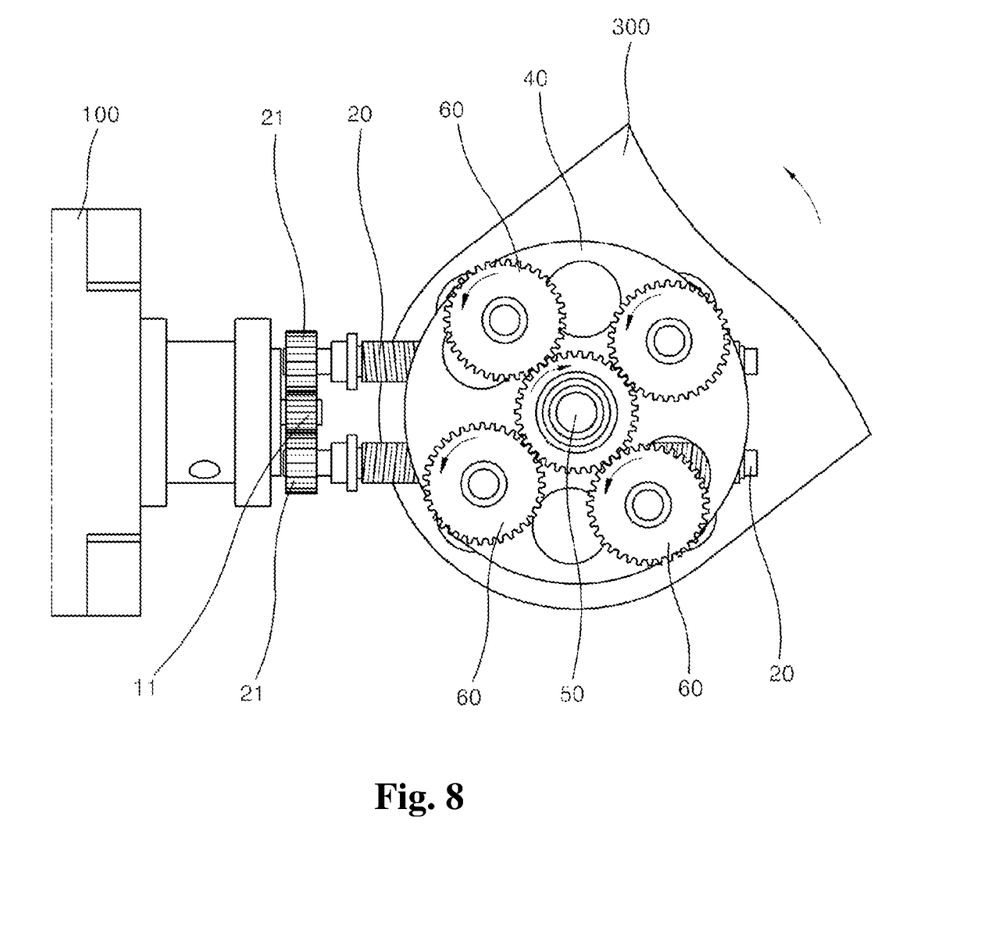
FIG. 8 is a view illustrating the operation in the state depicted in FIG. 7.

Therefore, when the driven shaft 50 is rotated by the power transmitted thereto from the driving unit via the worm shafts 20, the worm wheels 30 and the ring gears 40, each of the planetary gears 60 revolves as well as rotates on its axis, and the rotary member 300, which is connected to the planetary gears 60, is rotated by the revolution of the planetary gears 60.

Figure 9:
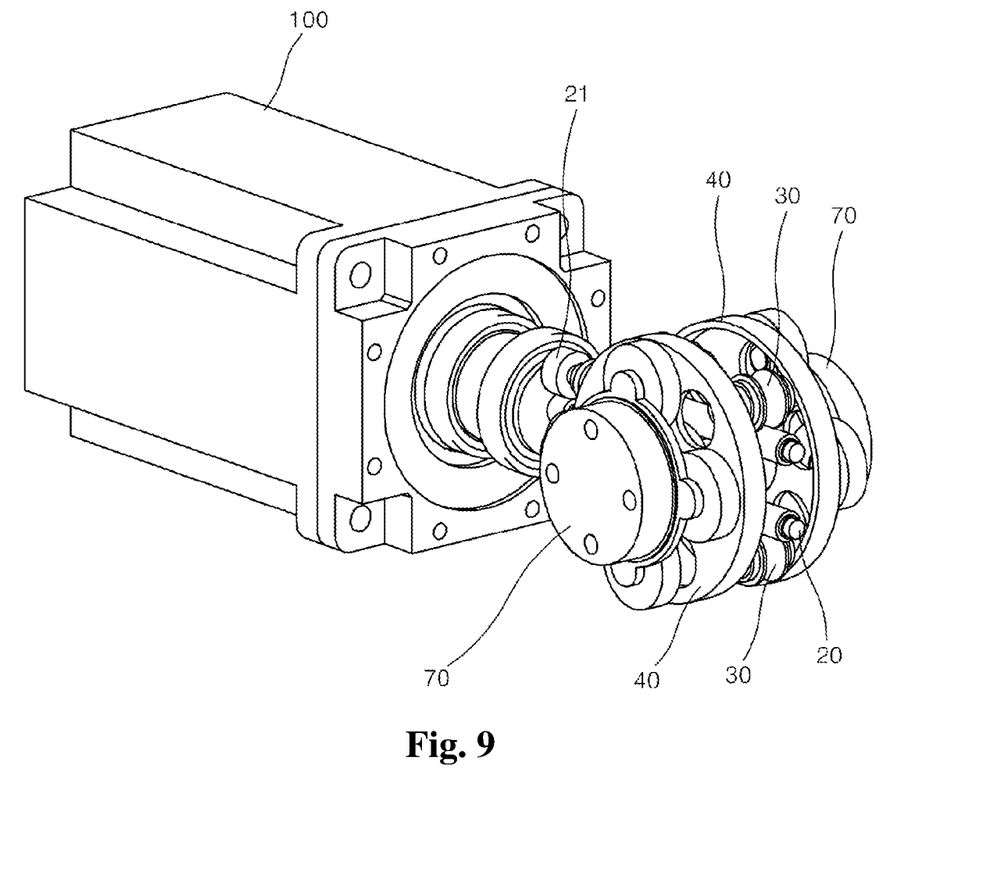
FIG. 9 is a perspective view illustrating the state in which a connection member is mounted to the planetary gear of the speed reducer according to the present invention.
Figure 10:
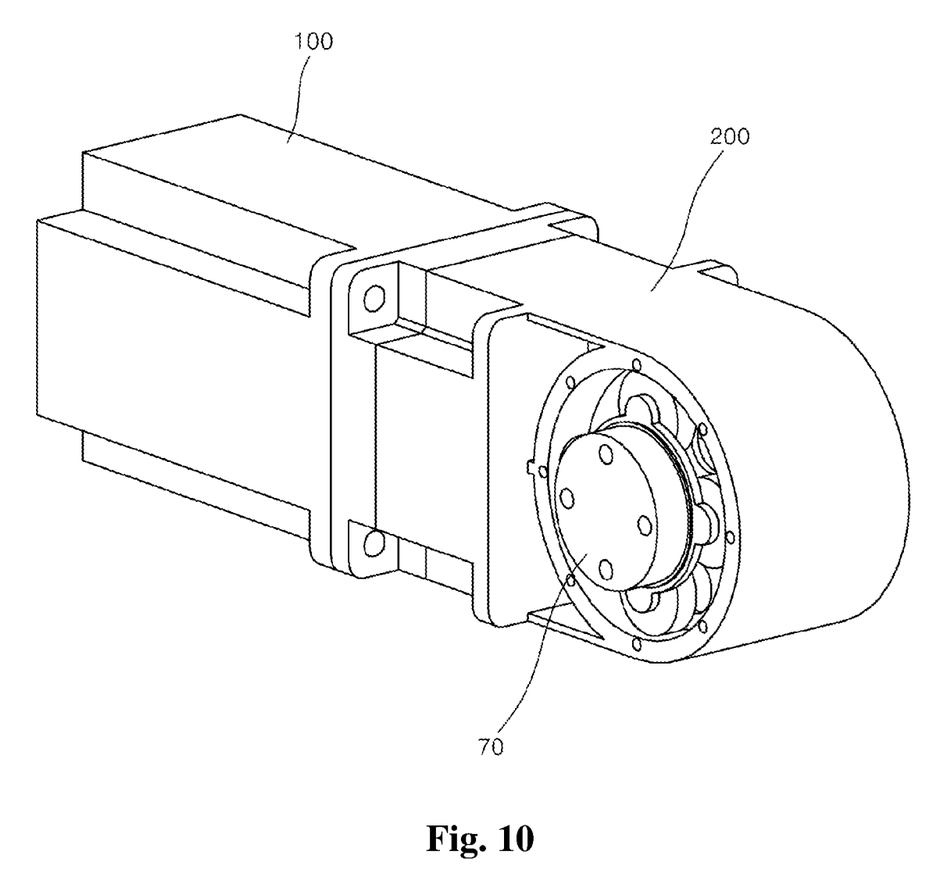
FIG. 10 is a perspective view illustrating the state in which a gear housing is mounted to the configuration depicted in FIG. 9.
Figure 11:
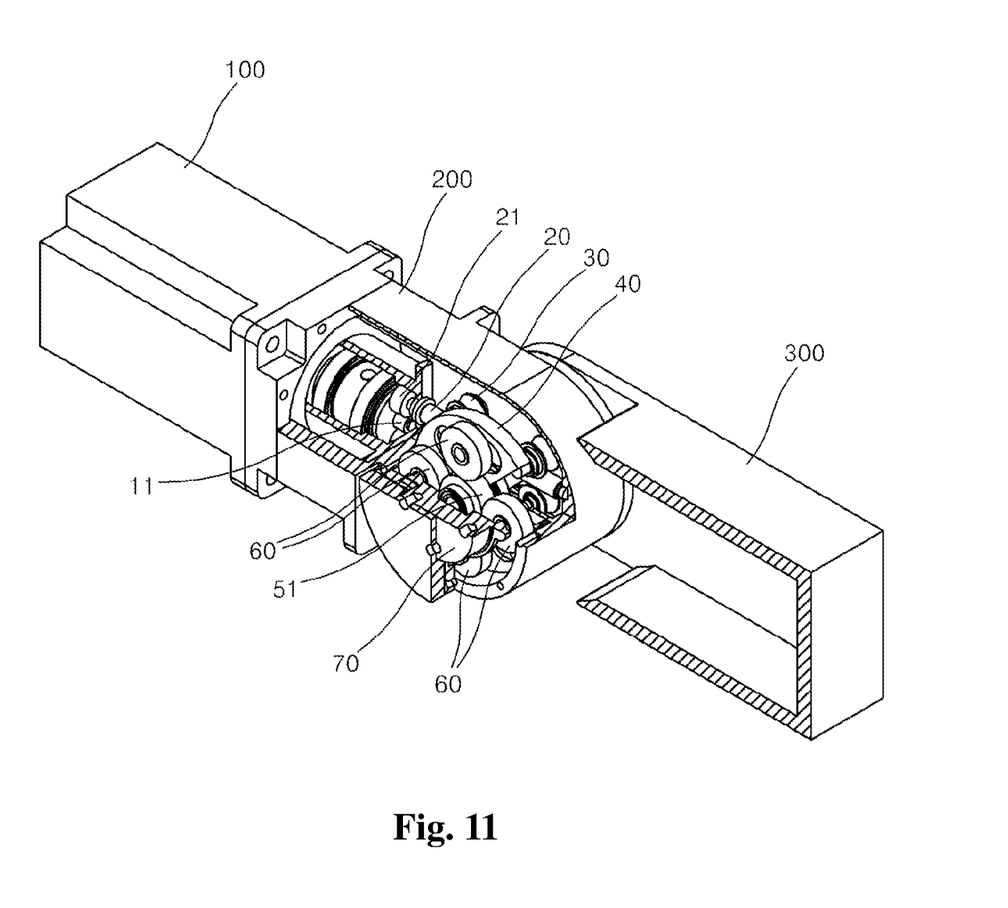
FIG. 11 is a partially cut away perspective view of FIG. 10.

As shown in FIGS. 9 to 11, the planetary gears 60 are supported by a connection member 70, the rotary member 300 is connected to the outer side of the connection member 70, all of the gear sets are enveloped and supported by the housing 200, and both lateral sides of the housing 200 are open, through which the rotary member 300 is connected to the driven shaft 50 or to the auxiliary speed reduction units.

The above-described present invention can be applied to various kinds of devices. In the case in which the speed reducer according to the present invention and the rotary member are used for a joint of a robot, the rotary member corresponds to an arm of the robot.

As illustrated in the drawings, only a single rotary member may be connected to both ends of the driven shaft or to the outer sides of the auxiliary speed reduction units. Alternatively, two different rotary members may be respectively connected to both ends of the driven shaft or to the auxiliary speed reduction units, or may be installed to the same so as to be rotatable at different speeds from each other.

In addition, the rotary member may be installed so as to be continuously rotatable in any direction, i.e. so as to be rotatable throughout 360 degrees.

In addition, the rotary member may be installed eccentrically on the axis of the driven shaft so as to be rotated eccentrically about the driven shaft.

The embodiments described above and illustrated do not limit the scope of the present invention, but are merely examples of constituent elements presented in the claims of the present invention.

INDUSTRIAL APPLICABILITY

A speed reducer according to the present invention includes a pair of worm shafts 20 having teeth angled in opposite directions to each other, the worm shafts being arranged parallel to each other and being configured to be rotated in the same direction as each other by a driving unit, a driven shaft 50 mounted between the worm shafts 20 so as to extend in a direction perpendicular to the worm shafts 20, a pair of ring gears 40 mounted so as to face each other, with the worm shafts 20 interposed therebetween, and fixed to the driven shaft 50, worm wheels 30 configured to mesh with the outer sides of the respective worm shafts 20, each of the worm wheels having shaft gears 31, which are formed at both sides thereof so as to mesh with the ring gears 40, and a rotary member 300 connected to the driven shaft 50 to output rotational force with a speed reduced.

Therefore, the rotational force output from the driving unit is transmitted to the worm shafts 20, and the rotational-axis direction of the driving unit is changed to a direction perpendicular thereto as the rotational force is transmitted to the worm wheels 30, the ring gears 40 and the driven shaft 50. Through this process, the output driving force can be stably transmitted with a speed reduced, and can be precisely controlled, and both ends of the driven shaft can output the driving force at the same time, thereby preventing undesirable movement of the driven shaft and consequently realizing stable power transmission.

In addition, since any of various kinds of gears, e.g. a planetary gear, a spur gear or a harmonic gear, can be selectively used as a speed reduction gear for transmitting rotational force while reducing a speed, the speed reducer according to the present invention has high industrial applicability because it can be widely applied in various fields, and can be a practical device that has a small size and is precisely controlled.

The invention claimed is:

1. A speed reducer comprising:
    a pair of worm shafts having teeth angled in opposite directions to each other, the worm shafts being arranged parallel to each other and being configured to be rotated in a same direction as each other by a driving unit;
    a driven shaft mounted between the worm shafts so as to extend in a direction perpendicular to the worm shafts;
    a pair of ring gears mounted so as to face each other, with the worm shafts interposed therebetween, the ring gears being fixed to the driven shaft;
    a worm wheel configured to mesh with an outer side of each of the worm shafts, the worm wheel having shaft gears formed at both sides thereof so as to mesh with the ring gears; and
    a rotary member connected to the driven shaft to output rotational force with a speed reduced.

2. The speed reducer according to claim 1, wherein a driving gear is mounted to a driving shaft connected to the driving unit, and
    wherein both of the worm shafts mesh with and are driven by the driving gear.

3. The speed reducer according to claim 1, further comprising:
    an auxiliary speed reduction unit provided at the driven shaft,
    wherein rotational force is transmitted to the rotary member, with the speed reduced, by the auxiliary speed reduction unit.

4. The speed reducer according to claim 3, wherein the auxiliary speed reduction unit is a planetary gear device comprising a sun gear mounted to the driven shaft and a plurality of planetary gears meshing with the sun gear.

5. The speed reducer according to claim 3, wherein the auxiliary speed reduction unit is configured as a combination of spur gears.

6. The speed reducer according to claim 3, wherein the auxiliary speed reduction unit is configured as a harmonic gear.

7. The speed reducer according to claim 1, wherein the rotary member is installed so as to be rotatable throughout 360 degrees.

8. The speed reducer according to claim 1, wherein the rotary member is installed eccentrically on the driven shaft so as to be rotated eccentrically.

* * * * *